(12) United States Patent
Bélanger et al.

(10) Patent No.: US 10,767,114 B2
(45) Date of Patent: *Sep. 8, 2020

(54) PYROLYSIS SYSTEM AND METHOD FOR BIO-OIL COMPONENT EXTRACTION

(71) Applicant: Tolero Energy, LLC, Sacramento, CA (US)

(72) Inventors: Raymond Bélanger, Chilliwack (CA); Christopher Churchill, Sacramento, CA (US)

(73) Assignee: Tolero Energy, LLC, Sacramento, CA (US)

(*) Notice: Subject to any disclaimer, the term of this patent is extended or adjusted under 35 U.S.C. 154(b) by 759 days.

This patent is subject to a terminal disclaimer.

(21) Appl. No.: 14/568,422

(22) Filed: Dec. 12, 2014

(65) Prior Publication Data
US 2015/0107150 A1 Apr. 23, 2015

Related U.S. Application Data

(63) Continuation-in-part of application No. 13/907,494, filed on May 31, 2013, now Pat. No. 10,589,187.

(51) Int. Cl.
*B01D 5/00* (2006.01)
*C10B 53/02* (2006.01)
(Continued)

(52) U.S. Cl.
CPC ............ *C10B 53/02* (2013.01); *B01D 5/006* (2013.01); *B01D 5/0027* (2013.01);
(Continued)

(58) Field of Classification Search
CPC ..... B01D 5/0027; B01D 5/003; C10L 353/02; C10G 1/02; C10C 5/00; Y02E 50/14;
(Continued)

(56) References Cited

U.S. PATENT DOCUMENTS

| | | | | |
|---|---|---|---|---|
| 1,830,921 A | * | 11/1931 | Michelman | C10B 47/46 201/2.5 |
| 4,591,366 A | * | 5/1986 | Wohner | C10G 1/002 95/14 |
| 5,728,271 A | * | 3/1998 | Piskorz | B01J 8/1836 201/25 |

(Continued)

OTHER PUBLICATIONS

W.N.R.W. Isahak, M.W.M. Hisham, M.A. Yarmo, T.Y.Y. Hin, "A review on bio-oil production from biomass by using pyrolysis method" Renew Sustain Energy Rev, 16 (2012), pp. 5910-5923 (Year: 2012).*

*Primary Examiner* — Jonathan Luke Pilcher
(74) *Attorney, Agent, or Firm* — Lance Kreisman; Peninsula Patent Group

(57) ABSTRACT

A system is described that includes a pyrolyzer and a primary condenser. The primary condenser is coupled to the pyrolyzer and configured to receive pyrolytic vapors from the pyrolyzer. The primary condenser is further configured to condense the pyrolytic vapors by contacting the pyrolytic vapors with a condensing liquid, to form a bio-oil component mixture having multiple separated phases. At least a portion of the condensing liquid includes a component that is extracted as a separated stable phase from a second bio-oil component mixture resulting from a prior pyrolysis cycle.

11 Claims, 3 Drawing Sheets

(51) Int. Cl.
*C10G 1/02* (2006.01)
*C10L 1/02* (2006.01)
*C10C 5/00* (2006.01)
*C10K 1/18* (2006.01)
*C10K 1/08* (2006.01)
*C10K 1/04* (2006.01)
*C10L 1/18* (2006.01)

(52) U.S. Cl.
CPC .............. *B01D 5/0087* (2013.01); *C10C 5/00* (2013.01); *C10K 1/04* (2013.01); *C10K 1/08* (2013.01); *C10K 1/18* (2013.01); *C10L 1/026* (2013.01); *C10L 1/1817* (2013.01); *B01D 5/003* (2013.01); *C10G 1/02* (2013.01); *C10L 2200/0469* (2013.01); *C10L 2270/026* (2013.01); *C10L 2290/02* (2013.01); *C10L 2290/544* (2013.01); *Y02E 50/14* (2013.01); *Y02E 50/32* (2013.01)

(58) Field of Classification Search
CPC ......... Y02E 50/10; Y02E 50/32; C10B 53/02; C10B 53/00; C10B 53/04; C10B 53/06; C10B 53/07; C10B 53/08
See application file for complete search history.

(56) References Cited

U.S. PATENT DOCUMENTS

| | | | | |
|---|---|---|---|---|
| 5,853,548 | A * | 12/1998 | Piskorz | B01J 8/1836 201/25 |
| 7,998,315 | B2 * | 8/2011 | Bridgwater | C10B 53/02 201/2.5 |
| 8,217,211 | B2 * | 7/2012 | Agrawal | C01B 3/042 201/21 |
| 8,436,120 | B2 * | 5/2013 | Piskorz | C05D 9/00 127/37 |
| 8,940,060 | B2 * | 1/2015 | Baird | C10K 1/08 44/307 |
| 2004/0108251 | A1 * | 6/2004 | Gust | C10B 49/22 208/126 |
| 2009/0082604 | A1 * | 3/2009 | Agrawal | C01B 3/042 585/242 |
| 2009/0126433 | A1 * | 5/2009 | Piskorz | C05D 9/00 71/25 |
| 2009/0227766 | A1 * | 9/2009 | Bridgwater | C10B 53/02 530/202 |
| 2013/0152455 | A1 * | 6/2013 | Baird | C10K 1/08 44/307 |
| 2014/0352204 | A1 * | 12/2014 | Belanger | B01D 5/0057 44/307 |
| 2015/0096879 | A1 * | 4/2015 | Belanger | C10B 19/00 201/34 |

* cited by examiner

PYROLYSIS SYSTEM AND METHOD FOR BIO-OIL COMPONENT EXTRACTION

CROSS-REFERENCES TO RELATED APPLICATIONS AND TECHNICAL FIELD

This application is a Continuation-In-Part of U.S. application Ser. No. 13/907,494, filed May 31, 2013, and expressly incorporated by reference herein. The disclosure herein relates to pyrolysis vapor condensation, and more specifically to bio-oil component extraction in a pyrolysis system.

BACKGROUND

Pyrolyzed vapors from "material" ("material" can consist of and/or contain petroleum compounds, plastics, tires, biomass (both vegetal and animal), solid wastes, extracts of liquid wastes, or a combination thereof) can, when condensed completely, produce a liquid known as bio-oil. The resulting raw bio-oil includes a high proportion of water and organic acids, and other thermal decomposition products from the pyrolyzed material. Raw bio-oil is often chemically unstable and typically rapidly polymerizes. Moreover the energy content or energy density of raw bio-oil is about half that of crude oil, due mostly from the amount of water and polar species contained within. Raw bio-oil is generally also very acidic and corrosive to some parts found in standard motors and turbines. Raw bio-oil often cannot be blended directly with other petroleum fuels due to its polarity as well as water content. Upgrading and de-watering raw bio-oil has, to this point, been difficult and expensive, making conventionally produced bio-oil economically unattractive.

One method for processing bio-oil vapors obtained from a slow pyrolysis process involves quenching the vapors with biodiesel in a single-pass or stage. While this method may operate acceptably for some situations, continually feeding pure biodiesel into a quenching vessel to condense the bio-oil may prove costly for long-duration processes. Further, significant volumes of biodiesel may prove impractical to employ for such a system. In addition, a slow pyrolysis technique often produces lower quantity bio-oil, therefore negatively affecting the economics of such a system. Moreover, resulting bio-oil/biodiesel fuel mixtures produced with bio-oil extracted via the single-pass process may have problems passing fuel combustion standards, such as ASTM D975 or D6751.

What is needed is a more economical and practical system and method to extract bio-oil components from pyrolyzed material.

DETAILED DESCRIPTION

Figure 1:
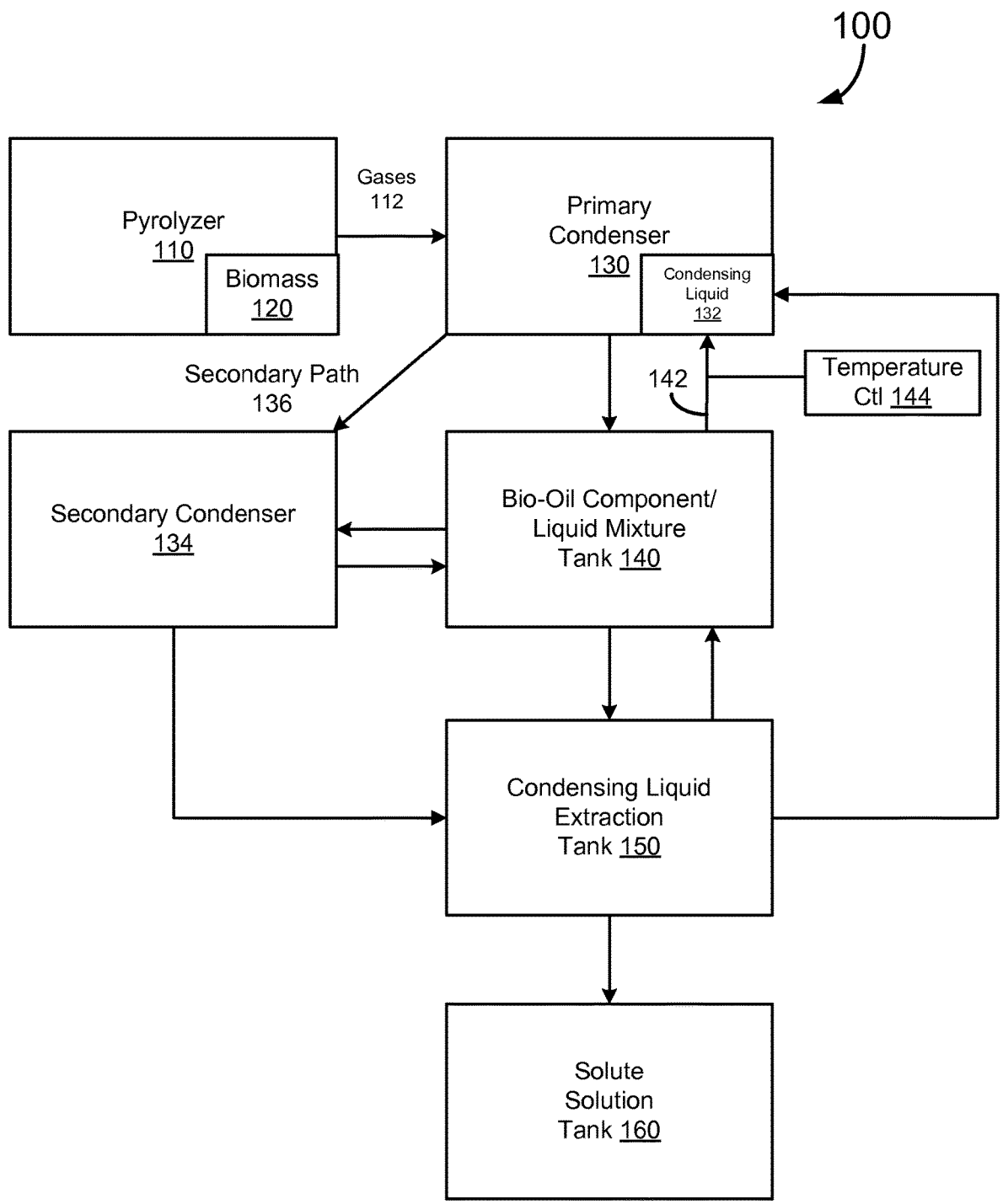
FIG. 1 illustrates a system for extracting bio-oil components from pyrolyzed material.

Examples of systems and methods are described below that provide for bio-oil component extraction from a material. In one embodiment, a system is described that includes a pyrolyzer and a primary condenser. The primary condenser is coupled to the pyrolyzer and configured to receive pyrolytic vapors from the pyrolyzer. The primary condenser is further configured to condense the pyrolytic vapors by contacting the pyrolytic vapors with a condensing liquid, to form a bio-oil component mixture having multiple separated phases. At least a portion of the condensing liquid includes a component that is extracted as a separated stable phase from a second bio-oil component mixture resulting from a prior pyrolysis cycle.

Examples further provide for a method of extracting bio-oil components from a bio-oil vapor. The method includes (a) pyrolyzing a material to generate a bio-oil vapor stream; (b) condensing a first amount of the bio-oil vapor stream with a condensing liquid to produce a bio-oil component mixture having multiple separated phases; (c) extracting at least one of the multiple separated phases as an extracted liquid; and (d) utilizing at least a portion of the extracted liquid as a second condensing liquid.

In a specific example, a non-polar high boiling point condensing liquid, such as a solvent for example, is used to condense bio-oil components from a material or waste material pyrolysis vapor stream. The resulting condensed bio-oil components are returned to the condensation zone to condense more pyrolysis vapors and load the condensing liquid with more bio-oil components. During the condensation process, an injection rate and temperature of the condensing liquid are controlled to obtain a particular quantity and quality of the resulting loaded solution. Moreover, in some embodiments, chemical species such as acetone, acetaldehyde, water and acetic acid, and the likes may be separated in situ by controlling the temperature. In other embodiments, it might be preferred to condense the totality of the condensable bio-oil components into the primary condenser and process this liquid for the separation of the phases and bio-oil components or fractions.

In another example, a bio-oil component condensate is further concentrated by extracting a fraction of the condensate mixed with bio-oil components and using that extracted fraction to condense more bio-oil components. The fraction extracted in totality or in part is based on selective boiling point ranges to improve some characteristics like viscosity and solubility, for example, of the final liquid. In all examples, the resulting liquids are distinct and stable bio-oil components.

In a third example, a distinct and stable liquid is produced from pyrolysis vapors which can be used directly in conjunction with a wide variety of fuels.

System Description

Although illustrative embodiments are described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments.

FIG. 1 illustrates a system, generally designated 100, for extracting bio-oil components from pyrolyzed material. The system 100 includes a pyrolizer 110 where a material, such as a biomass 120, is exposed to heat with little or no oxygen present. Embodiments recognize that fast and flash pyrolysis (e.g. greater than 1000° C./min heating rates) may provide, for example, generation of higher liquid yields of better quality of bio-oil component/liquids 140. The material 120 fed to the pyrolizer 110 can consist of and/or contain petroleum compounds, plastics, tires, biomass (both vegetal and animal), solid wastes, extracts of liquid wastes, or a combination thereof, and the like.

Gases 112 generated by the pyrolysis of the material 120 are directed from the pyrolyzer 110 to an input of a primary condenser 130. The condenser causes bio-oil component vapor to condense to a liquid form of bio-oil components. Under specific conditions, this condensate may separate spontaneously in different distinct and stable phases that are subsequently separated or is separated into distinct and stable phases of bio-oil components. In one embodiment, the primary condenser 130 takes the form of a condensing chamber. Other embodiments may employ non-condensing techniques. In a specific condensing embodiment, a second input to the condenser receives a condensing liquid 132, such as a solvent. The condensing liquid is generally sprayed onto the gases (pyrolysis vapors) to form a liquid containing bio-oil components that can be stored in a tank 140.

Further referring to FIG. 1, for one embodiment, a recirculator 142 couples the inlet to the condenser 130 to an outlet of the mixture tank 140 to feed at least a portion of the liquid containing bio-oil components back to the condenser 130. The fed back liquid is then used to condense additional bio-oil component vapors as more fully explained below. In some embodiments, a temperature controller 144 may be employed to control the temperature of the liquid going into the condenser to condense an optimal percentage of bio-oil components from the vapor stream.

With continued reference to FIG. 1, bio-oil component vapors that fail to condense in the primary condenser 130 may be directed to an input of a secondary condenser 134 along a secondary path 136. A condensing process similar to that of the primary condenser 130 is carried out in the secondary condenser 134. A resulting liquid containing bio-oil components from the secondary condenser is fed from an outlet to the condensed liquid tank 140. A secondary recirculator extends from the condensed liquid tank 140 back to the secondary condenser 134 to feed the liquid containing bio-oil components as the condensing liquid in the secondary condenser. Just like the process taking place in the primary condenser, the production of spontaneous or induced phase separation of stable bio-oil components can also take place in the secondary condenser. Subsequent processes may be employed to separate the phases and produce bio-oil component fractions.

The condensed liquid containing bio-oil components situated in tank 140 may maintain a constant volume, and includes a third outlet that feeds a condensing liquid or bio-oil fraction extractor tank or vessel 150. As more fully explained below, the condensing liquid component of the liquid containing bio-oil components may be separated from the bio-oil component liquid, and returned to the condensation liquid tank 140. The condensing liquid or component fraction extracted from the bio-oil component liquid can also be returned to the condenser 130 via the recirculator line 142 going from the bio-oil components tank 140 to the condenser 130. The resulting liquid containing bio-oil components may then be fed to a solute solution tank 160, where further separation, purification or refining may take place.

For some embodiments, the characteristics of the condensing liquid can be selected to improve the component separation of the pyrolytic chemical species 12 and the stability of the phases and bio-oil components. For example, the condensing liquid polarity may provide better separation of chemicals of interest, and as such may be selected based on the intended end use. For example, in the case of a fuel compatible mixture, a non-polar or substantially non-polar liquid may be used to capture non-polar chemical species from the bio-oil components which are miscible in standard petroleum fuels. The selection of the condensing liquid is expected to create stable and distinct phases of the bio-oil components.

Polar liquids can also be used as the condensing liquid. For example, use of a polar liquid as the condensing liquid can cause polar compounds to be captured, causing the non-polar species to separate in a different layer from the polar condensed liquid. The non-polar species can then be separated in a separate and stable phase. The different phases can then be separated and further processed. A given phase may include a mixture of chemicals, or a purified chemical. Ionic solvents can also be used and similarly removed, recycled and reused.

The primary condenser 130 may further be injected with reagents, such as, for example, steam, hydrogen, or other catalysts. The reagents can be injected into the condenser 130 or blended with the condensing liquid when applicable. The heat present in the pyrolysis vapors or condenser 130 can then be utilized to activate a chemical reaction.

The boiling and melting points of the condensing liquid can also be varied. In an example, the liquid can be selected to have a melting point lower than that of room temperature to avoid mechanical issues, such as clogging of the condensation and transfer systems. The condensing liquid may also be selected to have a low melting point to avoid freezing during normal ambient storage. Additionally, the boiling point of the condensing liquid can be selected based on the use of the condenser 130 and condensing liquid, for purpose of condensation. The condensing liquid can further be selected to have a minimum of decomposition during condensation.

The condensing liquid can be selected to have a boiling temperature low enough to be extracted under normal or reduced pressure while maintaining captured bio-oil components. For example the condensing liquid can be selected from the following chemical groups; alkanes, alkenes, aromatics, alcohols, ketones, aldehydes, fatty acids, fatty esters, triglycerides, esters, their derivatives, and a combination thereof. The condensation liquid can also be pure or a mixture of chemical components. The condensing liquid can also be an astable fraction of the bio-oil components. The fraction of the bio-oil components can be either polar or non-polar. More complex mixtures like biodiesel, vegetable oil, motor oil, and hydrocarbon distillation cuts can also be used. The condensing liquid can also be ionic liquids some of which can be recycled via separation techniques.

After gases 112 are condensed by the condensing liquid, stable and distinct phases of liquid containing bio-oil components are formed and contained by the liquid containing bio-oil components tank 140. The liquid containing bio-oil components includes components from the gases 112, particularly bio-oil components. The condensed liquid containing bio-oil components can be captured for a maximum recycling yield as well as minimizing the losses downstream and avoid contamination in the rest of the system.

The removal of heat by condensation is obtained when the heat of the gases 112 is transferred to the condensing liquid. For example this can be accomplished by rapidly contacting the pyrolysis gases 112 with the condensing liquid in the primary condenser 130. In such examples the condensing liquid can be sprayed in the direct path of the pyrolysis gases in a condensation process. In another example, the solvent may be introduced as a falling film with the gases 112. In yet another example, the gases 112 can be forced through a packed bed wetted with the condensing liquid or bubble through a liquid layer of the condensing liquid.

As noted above, in the example of FIG. 1, the resulting liquid containing bio-oil components contained in the tank 140 is further used as the condensing liquid. To do this, the selected phase of the resulting liquid containing bio-oil components is directed back to the primary condenser 130 via the recirculator 142 as the condensing liquid for further condensation. Examples provide for the system to be operated, among other possibilities, as a batch or a continuous process. In a batch process, the condensing liquid containing bio-oil components tank 140 is filled with the condensing liquid to a level corresponding to the fraction of condensing liquid in the final condensed liquid containing bio-oil components. A portion of the condensing liquid is transferred to the primary condenser 130 to condense a first portion of bio-oil components. The resulting liquid containing bio-oil components is continually transferred back to the primary condenser 130 until the liquid level in the liquid containing bio-oil components tank has reached the filled mark, giving a final liquid containing bio-oil components with an optimum bio-oil components content. The recirculator is stopped and the final liquid containing bio-oil components is entirely transferred to the condensing liquid extraction tank 150. In a continuous process, the condensing liquid containing bio-oil components may be slowly bled to the condensation liquid extraction tank 150 while fresh or recycled condensing liquid is mixed with the liquid containing bio-oil components, and this liquid is then introduced to the condensation system. For one embodiment, during a continuous process, a volume level and concentration of the mixture is kept constant. In both batch and continuous operations, when distinct and stable phases are present, all containing bio-oil components, the phases are separated continuously and only the phase of interest for condensing more bio-oil components condensable from the pyrolysis gases is recycled to induce condensation of condensable bio-oil components.

Embodiments recognize that, after condensation by the condensing liquid, desirable components (e.g. bio-oil components) or undesirable components (e.g. impurities) may still be present in gaseous, liquid or other forms. As such, the embodiment of FIG. 1 includes the secondary condenser 134 to receive a secondary stream from the primary condenser 130 for further condensation. Small quantities of the condensing liquid containing bio-oil components from the primary condenser may be entrained with the uncondensed gases to the secondary condenser 136.

By adjusting the exit temperature of the primary condenser 130 it is possible to selectively extract bio-oil components from condensed bio-oil containing liquids. For example, by controlling a gas outlet exit temperature of the primary condenser 130 to about 125 degrees C., it is possible to remove the acetic acid, water, methanol, and all other light chemical species having a boiling point inferior to the set temperature. This results in a anhydrous condensed liquid containing bio-oil components with little organic acids which can be stripped during the condensing liquid recycling step.

When the selected phase of the resulting liquid containing bio-oil components is directed into the extractor 150, the liquid containing bio-oil components can be fractionated by heating and condensing the vapors either by atmospheric or reduced pressure distillation, evaporation, and flash evaporation, or other methods. The liquid containing bio-oil components can be heated with heat from the primary condenser 130 to help in the fractionation 150. The condensing liquid is then usually, but not necessarily, purified further before being sent back to the primary condenser 130. Although the resulting liquid can be extracted in its totality, the resulting bio-oil components mixture can also contain a fraction of the original condensing liquid in order to improve its physicochemical characteristics, like viscosity. Alternatively, other compounds can also be added to improve the characteristics of the bio-oil component mixture. This resulting bio-oil component mixture or concentrate is chemically and physically stable and can be stored, blended or further processed while maintaining chemical properties.

Method Description

Figure 2:
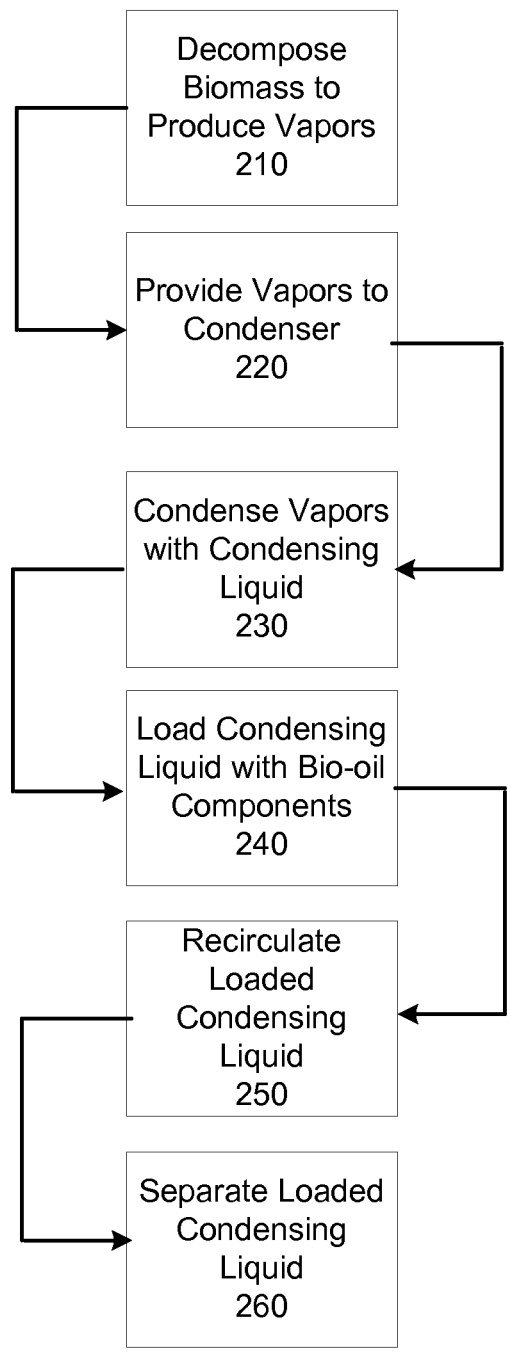
FIG. 2 illustrates a method for condensing bio-oil components from decomposed material fumes.

FIG. 2 illustrates a method for using a first condensing liquid to obtain bio-oil components from thermally decomposed material fumes. Reference is made to the embodiment of FIG. 1 in describing elements of FIG. 2.

At (210), a material is thermally decomposed to produce vapors. As described regarding FIG. 1, the vapors may include components which, when condensed, produce bio-oil components. For example, with reference to FIG. 1, a pyrolyzer may be used to decompose the material in the absence of oxygen to produce the vapors. In an example, the vapors produced in (210) can be obtained by heating the material (e.g. by exposure to a heating rate of 10,000 degrees Celsius/minute) without oxygen so that the material decomposes, producing mainly gases.

At (220), the vapors are provided to a condenser, such as a condensing reactor. The condensing reactor cools the gases from (210) by, for example, exposure to a condensing liquid. Examples of condensing reactors include a condenser, such as described in FIG. 1, provided with a condensing liquid. Among other forms, the condensing liquid may be a pure (e.g. substantially of a single kind of compound), a mixture of different compounds, or a loaded liquid (e.g. including having been exposed to, and loaded, with bio-oil components as more fully described below in (230) and (240)).

Further referring to FIG. 2, after being provided to the condensing reactor, the heated vapors are condensed at (230) by exposure to the condensing liquid, and the condensing liquid is loaded with bio-oil components from the heated vapors at (240). The condensing liquid, material and condenser may be selected or configured so that particular components are loaded into the condensing liquid. For example, aspects of the steps described above at (210) through (230) can be varied for production of a particular condensing liquid at (240). By way of example, at (210) the injection rate of the condensing liquid and temperature of the condensed liquid may be manipulated by the temperature controller to control the quantity and quality of the resulting loaded condensed liquid. Moreover, the temperature can be controlled to separate undesired chemical species. If multiple phases are present after condensation, the phases can be separated by standard separation methods.

At (250) the loaded condensing liquid having bio-oil components is recirculated to further condense vapors. Examples provide for (230)-(250) to be performed, among other possibilities, as a batch or a continuous process. In a batch process, once a target concentration of chemical species is attained, the loaded condensing liquid is transferred to the extraction tank or system. In a continuous process, the loaded condensing liquid is slowly bled to the extraction tank or system while fresh or an extracted fraction of condensing liquid is mixed with the loaded condensing liquid, and this mixture is then introduced to the condensation system. During a continuous process a level and concentration of the mixture is kept constant.

The loaded condensing liquid can then be separated to different fractions for reuse, and for use of the bio-oil components, at (260).

Figure 3:
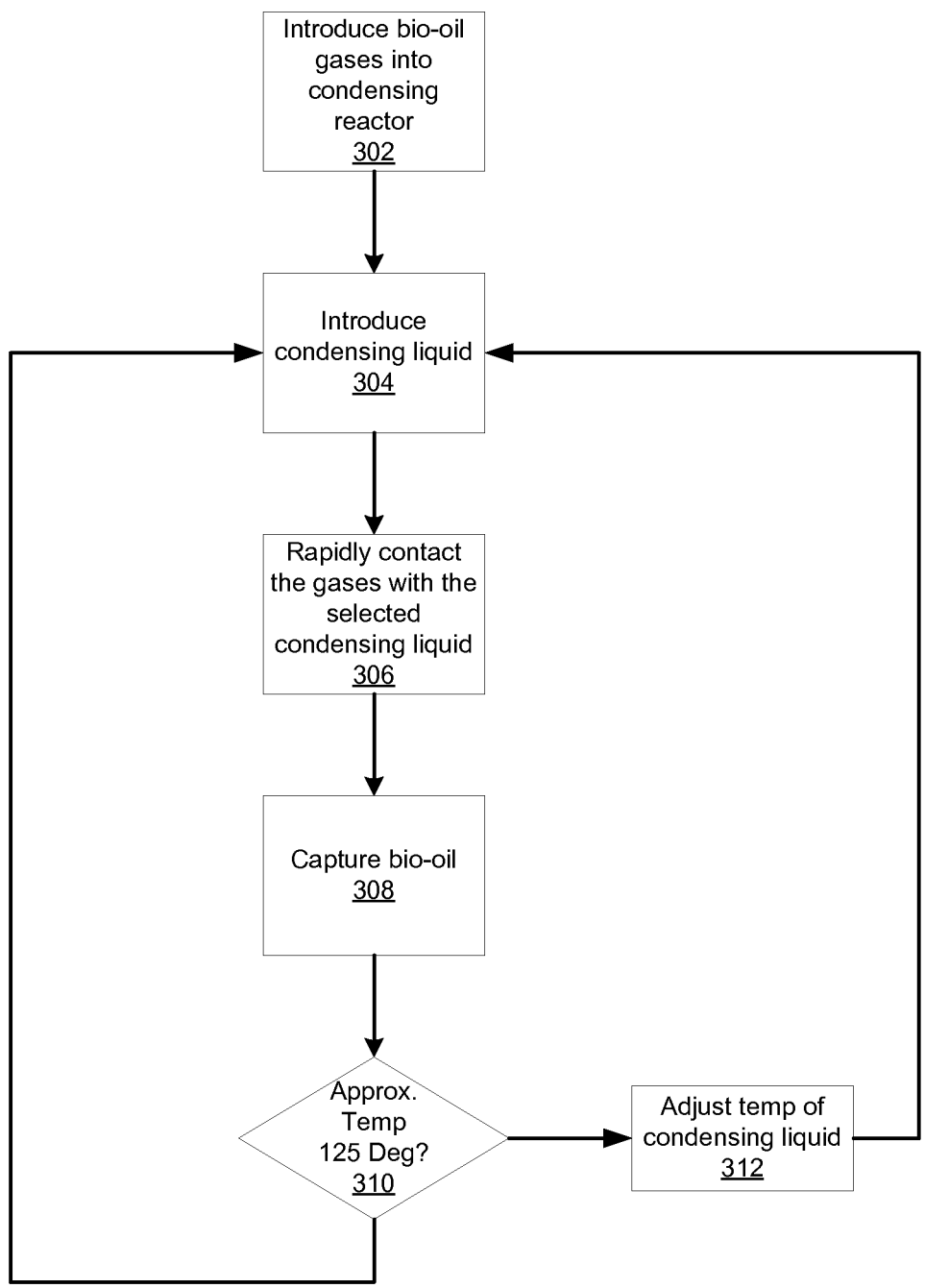
FIG. 3 illustrates further detail for one embodiment of the condensing of FIG. 2.

FIG. 3 illustrates further detail for one specific condensation method corresponding to the condensing step 230 described above in FIG. 2. The condensation process involves introducing bio-oil component gases into a condensation reactor, at 302, at a temperature selected between 350-750 degrees Celsius. Condensing liquid may then be introduced into the reactor, at 304, at a temperature that may be based on a temperature of captured bio-oil components from the condensation process, more fully explained below. The condensing liquid may then be sprayed or otherwise rapidly drawn into contact with the bio-oil component vapor, at 306. The resulting exchange of heat results in the condensation of a large portion of the bio-oil component vapor to bio-oil component liquid.

Further referring to FIG. 3, once the bio-oil components condense into liquid, it is then captured, at 308, and the resulting temperature monitored, at 310. For some embodiments, a resulting temperature of about 125 degrees C. results in an optimal extraction of desired bio-oil components liquid from the vapor. A determination is carried out, at 312, as to whether the captured liquid is approximately 125 degrees C. If so, then no temperature adjustments are carried out on newly fed condensing liquid into the condensation reactor. Should the temperature not be approximately 125 degrees C., then a temperature adjustment is made, at 314, to increase the temperature of the condensing liquid (if the resulting captured liquid is less than 125 degrees) or reduce the temperature of the condensing liquid (if the resulting captured liquid is higher than 125 degrees C.). In some other embodiments, the totality of bio-oil condensable components can be condensed in a single step. This temperature control mechanism optimizes the volume and quality of bio-oil component liquid extracted during each condensation operation.

EXAMPLE

For one specific example of system operation consistent with the disclosure above, a material in the form of waste wood was directed into a flash pyrolysis oven where it was rapidly heated at a rate in excess of 10,000° C./min up to about 500-550° C. The pyrolysis gases generated were rapidly removed and separated from hot biochars and directed, through a heated duct kept near 500° C., to the condenser. There, the pyrolysis vapors were sprayed-in-flight with a relatively cold mixture of condensing liquid containing bio-oil components in dodecane. The resulting liquid dropped into the primary condenser tank and was kept at about 125° C., while the uncondensed chemical species having a boiling point inferior to 125° C. went through the condensation tank to exit to a secondary condenser for collection. From the secondary condenser, the non-condensable gases were directed to a thermal oxidizer, returned to the process for heat generation, for the generation of other chemicals from catalysts, used elsewhere in the plant operation or transported off plant for other usage. The resulting concentration in the primary condenser tank was maintained at about 50% bio-oil components/dodecane. If distinct phases were present during the condensation, those were separated and only the phase containing the dodecane was returned for further bio-oil component condensation.

At the same rate that the 50% bio-oil components/dodecane solution was removed from the condensation tank, pure dodecane was mixed with the 50% bio-oil components/dodecane before introduction to the condensation zone. The liquid level in the condensation tank was kept constant. The 50% bio-oil components/dodecane solution removed from the condensation tank was directed to the fraction extraction system while keeping it at 125° C. The fraction extraction system was maintained at a constant temperature for the dodecane to evaporate at about 210-217° C. Alternatively, a vacuum system could be used to extract the dodecane and possibly use less energy than normal distillation at ambient pressure. The totality of the dodecane was extracted. The resulting bio-oil components were cooled and stored for future blending or transformation. The dodecane extracted could be further purified and then stored or returned for further condensation of bio-oil components.

In such an embodiment, dodecane is a pure solvent so its extraction can be done at a single temperature which is better for process control. When the process uses a pure solvent, no residues are left to accumulate in the system and the final product.

The utilization of an alkane as a co-solvent precipitates chemical species responsible for unacceptable levels of micro-carbon residues in the final blend. Moreover, in cases where a small quantity of condensing liquid is still present in the final product, the gel point of dodecane is significantly low to make the product compatible in environments with sub-zero temperatures.

In the following example, the dodecane is replaced over time by using a larger bio-oil fraction that is non-polar and with a boiling point range close to that of dodecane. A different range of bio-oil fraction with a different range of boiling point can also be extracted from the condensed, non-polar fraction of the condensed liquid with the goal of replacing the petroleum distillate with bio-oil components that would act in similar fashion to produce distinct and stable bio-oil phases.

The system, apparatus, and methods described above lend themselves well to extracting a purified form of bio-oil components liquid that may be mixed with, for example, diesel at fairly high mixture percentages. This is due in large part on the purity of the bio-oil components via the system and methods described herein, which results in lower residues forming during combustion of a purified bio-oil component/diesel fuel mixture. As a result, diesel mixed with a high percentage of bio-oil components may pass standards mandated by diesel fuel standards such as ASTM D975.

For some embodiments, the stable phase liquid extracted from the resulting bio-oil component liquid mixture may be packaged and sold for use as a condensing liquid for pyrolysis reactors. Chemical properties associated with the bio-oil that are loaded into the extracted condensing liquid make it suitable as an organically-created form of condensing liquid that may be more easily recycled, among other things, during the pyrolysis process.

Those skilled in the art will appreciate the benefits and advantages afforded by the embodiments disclosed herein. By allowing for phase separation during pyrolysis, extracting at least one of the resulting stable phases from the resulting bio-oil component liquid mixture, significant logistical and cost savings may be realized in the extraction of bio-oil components in a pyrolysis system.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the invention is not limited to those precise examples. As such, many modifications and variations will be apparent to practitioners skilled in this art. Accordingly, it is intended that the scope of the invention be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A pyrolysis system comprising:
   a pyrolyzer;
   a primary condenser, coupled to the pyrolyzer and configured to receive pyrolytic vapors from the pyrolyzer, and further configured to condense the pyrolytic vapors by contacting the pyrolytic vapors with a non-polar condensing liquid, to form a component mixture, such that the component mixture is phase separated into multiple separated phases, the component mixture including a non-polar bio-oil component originating from the pyrolytic vapors and a non-polar solvent component not originating from a pyrolysis process;
   wherein at least a portion of the non-polar condensing liquid comprises a fraction that is extracted as a separated stable phase from a second bio-oil component mixture resulting from a prior pyrolysis cycle.

2. The system according to claim 1, wherein at least a portion of the non-polar condensing liquid is loaded with chemical properties associated with the second bio-oil component mixture.

3. The system according to claim 1, further comprising:
   an extractor to extract at least one of the multiple separated phases from the bio-oil component mixture to obtain a second non-polar condensing liquid.

4. The system according to claim 3, wherein at least a portion of the second non-polar condensing liquid is recycled for use with the non-polar condensing liquid.

5. The system according to claim 4, and further comprising:
   a capture vessel to receive the bio-oil component mixture having multiple separated phases; and
   a recirculator coupled to the capture vessel and the primary condenser, the recirculator configured to provide at least a portion of the second non-polar condensing liquid to the primary condenser.

6. The system of claim 1, wherein the non-polar solvent component comprises a higher alkane.

7. A system for pyrolyzing material, the system comprising:
   a pyrolyzer;
   a primary condenser, coupled to the pyrolyzer and configured to receive pyrolytic vapors from the pyrolyzer, and further configured to condense the pyrolytic vapors by contacting the pyrolytic vapors with a non-polar condensing liquid, to form a bio-oil component mixture, such that the bio-oil component mixture is phase separated into multiple separated phases, the component mixture including a non-polar bio-oil component originating from the pyrolytic vapors and a non-polar solvent component not originating from a pyrolysis process;
   a capture vessel to receive the bio-oil component mixture; and
   a recirculator coupled to the capture vessel and the primary condenser, the recirculator configured to provide at least one of the multiple phases of the bio-oil component mixture as a second non-polar condensing liquid for use as at least a portion of the non-polar condensing liquid used in the primary condenser.

8. The system according to claim 7, further comprising:
   an extractor to extract the second non-polar condensing liquid from the bio-oil component/solvent mixture.

9. The system according to claim 8, wherein the extractor operates to extract the second non-polar condensing liquid in a batch or continuous basis.

10. The system according to claim 8, wherein the extractor comprises one from the group of an atmospheric or reduced pressure distiller, evaporator, flash evaporator, or others.

11. The system of claim 7, wherein the non-polar solvent component comprises a higher alkane.

* * * * *